(12) United States Patent
Kunieda et al.

(10) Patent No.: US 8,211,818 B2
(45) Date of Patent: Jul. 3, 2012

(54) HONEYCOMB STRUCTURAL BODY

(75) Inventors: Masafumi Kunieda, Gifu (JP); Shinnosuke Goto, Gifu (JP); Toshiyuki Miyashita, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 447 days.

(21) Appl. No.: 12/248,625

(22) Filed: Oct. 9, 2008

(65) Prior Publication Data

US 2009/0247395 A1   Oct. 1, 2009

(30) Foreign Application Priority Data

Mar. 27, 2008   (WO) .................. PCT/JP2008/055969

(51) Int. Cl.
*B01J 29/06* (2006.01)
*B01J 23/10* (2006.01)

(52) U.S. Cl. ............. 502/60; 502/63; 502/64; 502/65; 502/66; 502/68; 502/304; 502/527.12; 502/527.19; 502/527.24

(58) Field of Classification Search ............. 502/527.12, 502/527.19, 527.24, 304, 60, 63, 64, 65, 502/66, 68
See application file for complete search history.

(56) References Cited

U.S. PATENT DOCUMENTS

| | | | |
|---|---|---|---|
| 4,239,656 A | 12/1980 | Fujitani et al. | |
| 5,677,258 A | 10/1997 | Kurokawa et al. | |
| 6,569,392 B1 * | 5/2003 | Li et al. | ........................ 423/213.5 |
| 2008/0118701 A1 | 5/2008 | Ohno et al. | |
| 2008/0241467 A1 | 10/2008 | Ohno et al. | |

FOREIGN PATENT DOCUMENTS

| | | |
|---|---|---|
| EP | 1 927 391 | 6/2008 |
| EP | 1 974 796 | 10/2008 |
| JP | 2000-296340 | 10/2000 |
| JP | 2005-349378 | 12/2005 |
| JP | 2007-268484 | 10/2007 |
| WO | WO 2005/063653 | 7/2005 |

* cited by examiner

*Primary Examiner* — Elizabeth Wood
(74) *Attorney, Agent, or Firm* — Ditthavong Mori & Steiner, P.C.

(57) ABSTRACT

A honeycomb structural body includes at least one honeycomb unit which has a longitudinal direction. The at least one honeycomb unit includes plural cell walls, an inorganic binder, and inorganic particles. The plural cell walls extends along the longitudinal direction from one end face to another end face of the at least one honeycomb unit to define plural cells. The inorganic particles include ceria particles, and a ceramic material which has a degree of self-sintering lower than a degree of self-sintering of the ceria particles.

16 Claims, 2 Drawing Sheets

HONEYCOMB STRUCTURAL BODY

CROSS-REFERENCE TO RELATED APPLICATIONS

The present application claims priority under 35 U.S.C. §120 to PCT Application No. PCT/JP2008/055969, filed Mar. 27, 2008. The contents of this application are incorporated herein by reference in their entirety.

BACKGROUND OF THE INVENTION

1. Field of the Invention

The present invention relates to a honeycomb structural body.

2. Description of the Related Art

Conventionally, a honeycomb structural body is provided in an exhaust gas treating apparatus used for treating HC, CO, $NO_X$ and the like included in exhaust gas discharged from automobiles. This honeycomb structural body has plural cells (through holes) which extend, along a longitudinal direction, from one end face to the other end face of the honeycomb structural body. These cells are separated from one another by cell walls.

For example, when the honeycomb structural body is used as a catalyst carrier, the cell walls support a catalyst such as platinum. When exhaust gas passes through such a catalyst carrier, components such as HC, CO, $NO_X$ and the like included in the exhaust gas are converted by catalyst reactions and the like, because the cell walls support the catalyst. Accordingly, the exhaust gas can be treated.

Such a honeycomb structural body is manufactured as follows. First, pillar-shaped honeycomb units having the same shape are joined together by interposing adhesive layers between the side faces of the honeycomb units. Accordingly, a predetermined number of honeycomb units are joined together. Then, the periphery of this assembly of honeycomb units is cut into a desired shape.

The honeycomb units primarily include inorganic particles, inorganic fiber, and an inorganic binder. There is a proposal for using honeycomb units including inorganic particles which is alumina or ceria (see, for example, WO 2005/063653).

Contents of WO 2005/063653 are incorporated herein by reference in their entirety.

SUMMARY OF THE INVENTION

According to one aspect of the present invention, a honeycomb structural body includes at least one honeycomb unit which has a longitudinal direction. The at least one honeycomb unit includes plural cell walls, an inorganic binder, and inorganic particles. The plural cell walls extends along the longitudinal direction from one end face to another end face of the at least one honeycomb unit to define plural cells. The inorganic particles include ceria particles, and a ceramic material which has a degree of self-sintering lower than a degree of self-sintering of the ceria particles.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
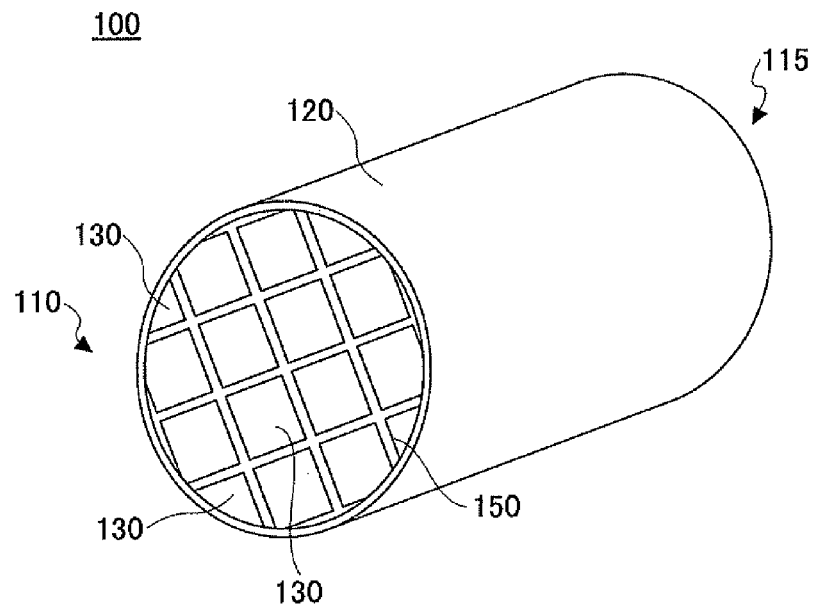
FIG. 1 is a schematic perspective view of an example of a honeycomb structural body according to an embodiment of the present invention.
Figure 2:
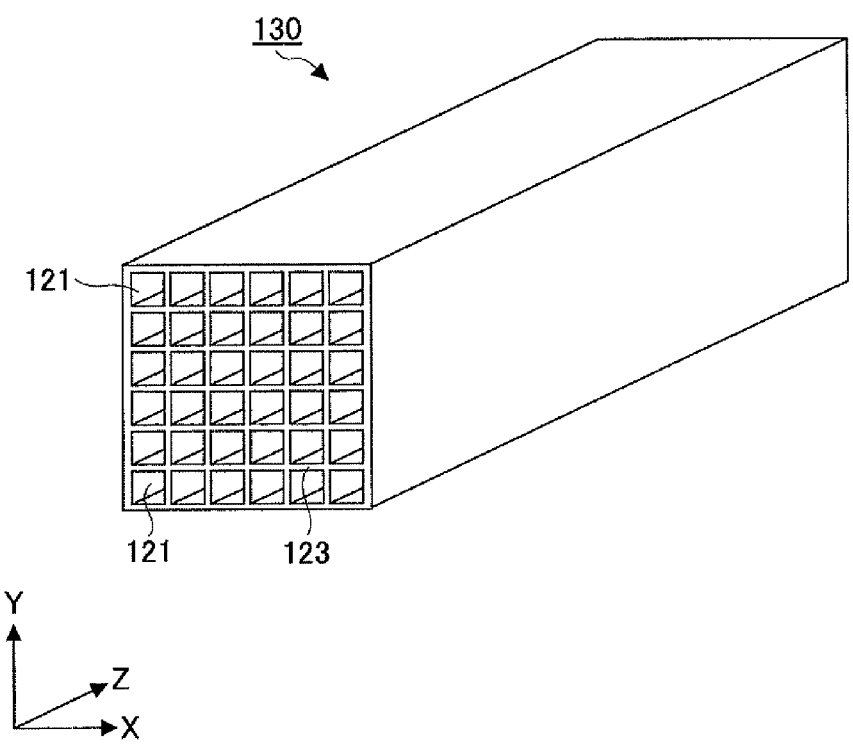
FIG. 2 is a schematic perspective view of an example of a honeycomb unit included in the honeycomb structural body shown in FIG. 1.

FIG. 1 is a schematic diagram of a honeycomb structural body according to an embodiment of the present invention. FIG. 2 is a schematic diagram of an example of a honeycomb unit, which is the basic unit of the honeycomb structural body shown in FIG. 1.

As shown in FIG. 1, a honeycomb structural body 100 according to an embodiment of the present invention has two opening faces 110 and 115. The peripheral surface of the honeycomb structural body 100 is provided with a coat layer 120, except for the two end faces.

The following describes an example of how the honeycomb structural body 100 is formed. FIG. 2 illustrates a pillar-shaped honeycomb unit 130 made of ceramics. Plural honeycomb units 130 (the example shown in FIG. 1 includes four horizontal rows and four vertical rows, i.e., a total of 16 honeycomb units) are joined together by interposing adhesive layers 150. Then the periphery is cut into a predetermined shape (a cylindrical shape).

As shown in FIG. 2, the honeycomb unit 130 has plural cells (through holes) 121 that are open at both end faces, and that extend in a longitudinal direction from one end to the other end of the honeycomb unit 130. Furthermore, the cells 121 are partitioned by cell walls 123.

When the honeycomb structural body is used as a catalyst carrier, the cell walls 123 support a catalyst such as platinum. When exhaust gas flows into one of the cells 121, components (HC, CO, $NO_X$ and the like) included in the exhaust gas are converted, and then the exhaust gas is discharged from the same cell. Accordingly, by making the exhaust gas flow through the honeycomb structural body 100, the components in the exhaust gas can be treated.

In the honeycomb structural body described in WO 2005/063653, different honeycomb units are used depending on the purpose. Alumina is primarily used for high dispersion of noble metal such as platinum, and ceria is primarily used for adhering $NO_X$.

However, honeycomb units primarily including ceria particles are not as strong as honeycomb units primarily including alumina particles. Thus, if a honeycomb structural body is to include honeycomb units primarily including ceria particles, this honeycomb structural body will become relatively easily breakable when external stress is applied.

An embodiment of the present invention provides a honeycomb structural body including ceria particles as inorganic particles, and has a preferable level of strength.

The honeycomb unit includes inorganic particles and an inorganic binder, and may also include inorganic fiber. Alumina particles or ceria particles can be used as the inorganic particles depending on the purpose. Generally, when molding a honeycomb, the inorganic particles are used as secondary particles. However, honeycomb units including ceria particles as inorganic particles are not as strong as honeycomb units including alumina particles as inorganic particles. Thus, if a honeycomb structural body is to constitute honeycomb units primarily including ceria particles, this honeycomb structural body will break relatively easily when external stress is applied.

This is because ceria particles have a "high degree of self-sintering". A term "high degree of self-sintering" means that primary particles easily bind to each other, but secondary particles do not easily bind to each other. Therefore, with inorganic particles that have a "high degree of self-sintering", it is difficult to achieve a fired body having a preferable level of strength.

The degree of self-sintering of ceria particles is considered to be higher than that of other inorganic materials such as alumina due to the following reasons. Generally, when particles bind together by sintering, the hydroxyl adhering to the surfaces of the particles has an important function. That is, it is considered that when hydroxyl is interposed between the particles, cohesion between the particles is enhanced. However, it is considered that in the case of ceria particles, the hydroxyl adhering to the surfaces of ceria particles is not used for cohesion between other substances, but for replenishing deficient oxygen on the surfaces of the ceria particles. It is considered that this is because ceria particles have more structural (lattice) defects (for example, holes) than other inorganic particles. Thus, it is considered that in the case of ceria, the amount of hydroxyl used for cohesion between other particles is relatively small.

Ceria has a high level of self-sintering, and therefore if a honeycomb unit is to include ceria particles, it will be difficult to achieve a honeycomb unit having a preferable level of strength by performing molding and firing processes. Furthermore, such a honeycomb unit including ceria particles is fragile and particles easily fall out. Thus, it is difficult to directly use ceria as the material of a honeycomb unit.

However, a honeycomb structural body according to an embodiment of the present invention has a preferable level of strength, even though the honeycomb structural body constitutes honeycomb units including ceria as the inorganic particles.

This is because the honeycomb units included in the honeycomb structural body according to an embodiment of the present invention includes inorganic particles other than ceria particles, i.e., a ceramic material other than ceria particles having a lower degree of self-sintering than ceria particles. That is, the honeycomb unit according to an embodiment of the present invention includes ceria particles, a ceramic material other than ceria particles having a lower degree of self-sintering than ceria particles, and an inorganic binder. The ceramic material other than ceria particles having a lower degree of self-sintering than ceria particles is not limited to one kind of material, but may include two or more kinds of materials. For example, the ceramic material other than ceria particles having a lower degree of self-sintering than ceria particles may be alumina, silica, zeolite, boehmite, or the like.

By adding, as inorganic particles, such a ceramic material other than ceria particles having a lower degree of self-sintering than ceria particles to the honeycomb unit, it will be easier to achieve a honeycomb unit having a preferable level of strength. It is considered that this is because the ceramic material other than ceria particles having a lower degree of self-sintering than ceria particles has a function of enhancing the cohesion between the ceria secondary particles.

The "degree of self-sintering" of the inorganic particles can be determined from the behavior of how the specific surface of a member including the subject inorganic particles changes after heat treatment. This is because if a member includes inorganic particles having a high "degree of self-sintering", its specific surface tends to decrease significantly.

For example, Table 1 shows how the specific surface changed after heat treatment under various conditions, for samples including different kinds of inorganic particles. In each experiment, the specific surface of the sample was measured by a so-called BET-N2 method (measuring apparatus: automatic specific surface and pore distribution measuring apparatus (TriStar 3000) manufactured by Shimadzu Corporation). Each sample was turned into powder weighing 0.2 g before being measured. As a result, it was found that in the sample including ceria particles, the specific surfaces decreased more significantly than the other samples (including γ alumina or zeolite). This is because the degree of self-sintering of ceria particles is higher than that of the other inorganic particles. As shown in these results, the degree of self-sintering increases in the order of zeolite, γ alumina, and ceria.

TABLE 1

| | SPECIFIC SURFACE ($m^2$/g) AFTER HEAT TREATMENT | | | | | |
|---|---|---|---|---|---|---|
| INORGANIC PARTICLE | BEFORE TREATMENT | AFTER 5 HOURS IN 500° C. | AFTER 5 HOURS IN 600° C. | AFTER 5 HOURS IN 700° C. | AFTER 5 HOURS IN 800° C. | AFTER 5 HOURS IN 900° C. |
| γ ALUMINA | 194 | 188 | 185 | 182 | 171 | 150 |
| ZEOLITE | 377 | 373 | 372 | 364 | 349 | 342 |
| CERIA | 155 | 145 | 109 | 70 | 52 | 28 |

As described above, the honeycomb unit according to an embodiment of the present invention constitutes, as inorganic particles, ceria particles and a ceramic material other than ceria particles having a lower degree of self-sintering than ceria particles. Thus, in such a honeycomb unit, the cohesion between inorganic particles is enhanced, therefore it is easy to achieve a honeycomb unit and moreover a honeycomb structural body having a preferable level of strength. Furthermore, by using ceria particles and a ceramic material other than ceria particles having a lower degree of self-sintering than ceria particles as inorganic particles, it will be easy to significantly reduce the amount of particles falling out from the finished honeycomb unit.

In an embodiment of the present invention, the ceramic material having a lower degree of self-sintering than ceria particles, which is used as the inorganic particles other than ceria particles, includes alumina, silica, zeolite, and boehmite.

Furthermore, the average particle size of the ceramic material other than ceria particles having a lower degree of self-sintering than ceria particles, is preferably approximately less than or equal to the average particle size of the ceria particles. Moreover, the average particle size of the ceria particles is preferably within a range of approximately 0.1 μm through approximately 10 μm.

The weight percentage of the ceramic material other than ceria particles having a lower degree of self-sintering than ceria particles with respect to the ceria particles is preferably within a range of approximately 10% through approximately 40%.

In the above description, the honeycomb unit 130 may include an inorganic binder other than inorganic particles. In addition, the honeycomb unit 130 can include inorganic fiber.

As the inorganic binder, inorganic sol, a clay-based binder or the like can be used. Specific examples of the inorganic sol are alumina sol, silica sol, titania sol, liquid glass, or the like. An example of a clay-based binder is double-chain structure clay such as white clay, kaoline, montmorillonite, sepiolite, attapulgite, or the like. These can be used alone or in combination.

Among these, it is preferable to include at least one kind selected from the group consisting of alumina sol, silica sol, titania sol, liquid glass, sepiolite, and attapulgite.

Furthermore, if inorganic fiber were to be added to the honeycomb unit, a preferable inorganic fiber material may be alumina, silica, silicon carbide, silica alumina, glass, potassium titanate, aluminum borate, or the like. These can be used alone or in combination. Among these, alumina fiber is the preferable material.

The lower limit of the amount of inorganic particles included in a honeycomb unit is preferably approximately 30 wt %, more preferably approximately 40 wt %, and even more preferably approximately 50 wt %. Meanwhile, the preferable upper limit is approximately 90 wt %, more preferably approximately 80 wt %, and even more preferably approximately 75 wt %. If the content of inorganic particles is more than or equal to approximately 30 wt %, the relative amount of inorganic particles that can contribute to converting $NO_X$ will hardly become small. Meanwhile, if the content of inorganic particles is less than or equal to approximately 90 wt %, the strength of the honeycomb unit will hardly be reduced.

The amount of the inorganic binder included in a honeycomb unit as solids content is preferably more than or equal to approximately 5 wt %, more preferably more than or equal to approximately 10 wt %, and even more preferably more than or equal to approximately 15 wt %. Meanwhile, the amount of the inorganic binder included in a honeycomb unit as solids content is preferably less than or equal to approximately 50 wt %, more preferably less than or equal to approximately 40 wt %, and even more preferably less than or equal to approximately 35 wt %. If the content of the inorganic binder as solids content was more than or equal to approximately 5 wt %, the strength of the honeycomb unit would hardly be reduced. Meanwhile, if the content of the inorganic binder as solids content was less than or equal to approximately 50 wt %, the moldability would hardly be degraded.

When the honeycomb unit includes inorganic fiber, as to the total amount of the inorganic fiber, the lower limit is preferably approximately 3 wt %, more preferably approximately 5 wt %, and even more preferably approximately 8 wt %. The upper limit is preferably approximately 50 wt %, more preferably approximately 40 wt %, and even more preferably approximately 30 wt %. If the content of the inorganic fiber was more than or equal to approximately 3 wt %, the effect of the inorganic fiber on enhancing the strength of the honeycomb unit would hardly be reduced. If the content of the inorganic fiber was less than or equal to approximately 50 wt %, the relative amount of inorganic particles that can contribute to converting $NO_X$ would hardly become small.

The cross-sectional shape of the honeycomb unit 130 perpendicular with respect to the longitudinal direction is not particularly limited. It can be any shape as long as honeycomb units can be joined together by interposing adhesive layers. The shape of the honeycomb unit 130 cross section can be a square, a rectangle, a hexagon, a sector, or the like.

Furthermore, the cross-sectional shape of each cell 121 of the honeycomb unit 130 perpendicular with respect to the longitudinal direction is not particularly limited. The shape can be, for example, a triangle or a polygon other than a square.

The cell density of the honeycomb unit 130 is preferably within a range of approximately 15.5 cells/cm$^2$ through approximately 186 cells/cm$^2$ (approximately 100 cpsi through approximately 1,200 cpsi), more preferably within a range of approximately 46.5 cells/cm$^2$ through approximately 170 cells/cm$^2$ (approximately 300 cpsi through approximately 1,100 cpsi), and even more preferably within a range of approximately 62.0 cells/cm$^2$ through approximately 155 cells/cm$^2$ (approximately 400 cpsi through approximately 1,000 cpsi).

The thickness of the cell walls 123 of the honeycomb unit 130 is not particularly limited; however, in consideration of the strength, the preferable lower limit is approximately 0.1 mm and the preferable upper limited is approximately 0.4 mm.

As described above, the cell walls of such a honeycomb unit support a catalyst such as noble metal. Examples of the noble metal are platinum, palladium, rhodium, or the like, although not particularly limited thereto.

The honeycomb structural body 100 according to an embodiment of the present invention can be any shape. Other than the cylindrical shape shown in FIG. 1, the shape of the honeycomb structural body 100 can be, for example, a cylindroid, a square pillar, a polygonal pillar, or the like.

The paste that forms the coat layer 120 and the adhesive layers 150 of the honeycomb structural body 100 (paste for coat layer and paste for adhesive layers) includes, for example, inorganic particles and an inorganic binder, and may additionally include inorganic fiber.

The coat layer 120 usually includes an inorganic binder and inorganic fiber, and is also made from a raw material paste including an organic binder. The organic binder may be, for example, polyvinyl alcohol, methylcellulose, ethyl cellulose, carboxyl methylcellulose, or the like. These can be used alone or in combination. Among these organic binders, carboxyl methylcellulose is preferable.

Then, the coat layer paste is applied to the peripheral surface of the honeycomb structural body, and is dried and solidified, thereby forming the coat layer. In the paste used as the raw material, a pore forming material may be added according to need, such as balloons that are microscopic hollow spheres made from oxide-based ceramics, spherical acrylic particles, graphite, or the like. The thickness of the coat layer is preferably approximately 0.1 mm through approximately 2.0 mm.

In the honeycomb structural body 100 according to an embodiment of the present invention, the adhesive layers 150 are made from the same material as the coat layer 120. However, the adhesive layers 150 may be made form a material different from that of the coat layer 120.

The honeycomb structural body 100 can be applied to, for example, an exhaust gas treating apparatus for treating exhaust gas discharged from a diesel engine or the like.

In the example described above, the honeycomb structural body is formed by joining together plural honeycomb units 130 by interposing adhesive layers 150, as shown in FIG. 1. However, an embodiment of the present invention is also applicable to a honeycomb structural body manufactured by molding a single unit, without the adhesive layers 150.

Figure 3:
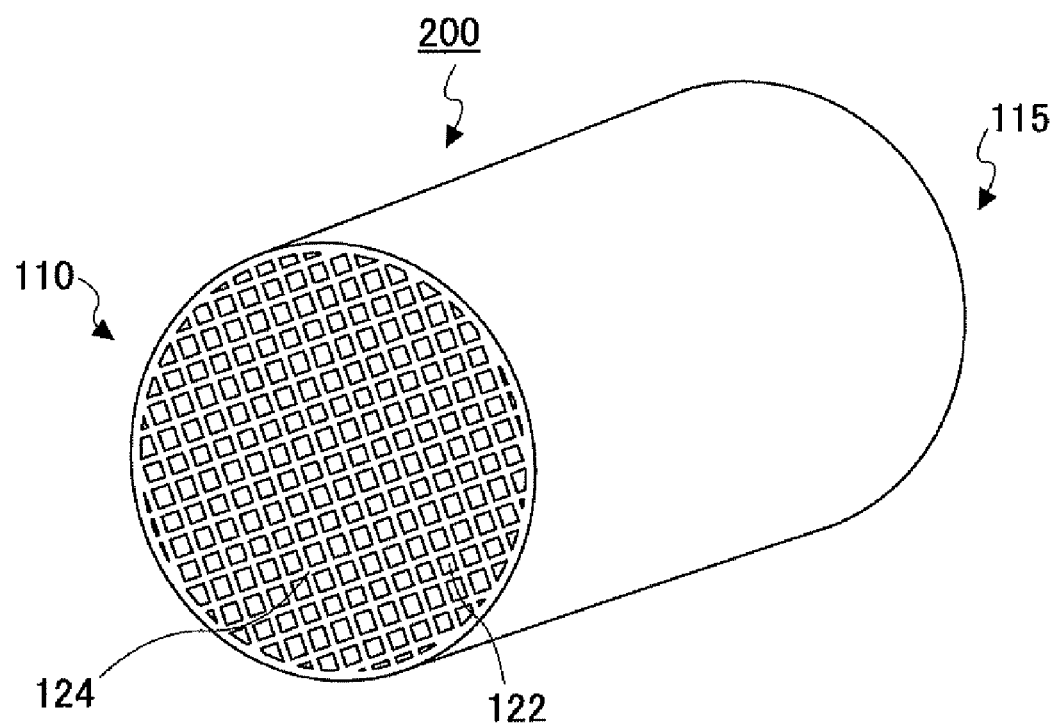
FIG. 3 is a perspective view of a honeycomb structural body according to an embodiment of the present invention that is different from the honeycomb structural body shown in FIG. 1.

Such a honeycomb structural body 200 is shown in FIG. 3. As shown in FIG. 3, the basic structure of the honeycomb structural body 200 is the same as that of the honeycomb structural body 100 shown in FIG. 1. Therefore, in FIG. 3, elements corresponding to those of the honeycomb structural body 100 are denoted by the same reference numbers. The peripheral surface of the honeycomb structural body 200 may be provided with or without a coat layer similar to that of the honeycomb structural body 100.

It is obvious to those skilled in the art that the same effects as described above can be achieved by including ceria particles and a ceramic material other than ceria particles having a lower degree of self-sintering than ceria particles in the honeycomb structural body 200, at least in cell walls 124 of the honeycomb structural body.

(Method of Manufacturing Honeycomb Structural Body)

Next, a description is given of a method of manufacturing a honeycomb structural body according to an embodiment of the present invention. The following describes an example of a method of manufacturing particularly a honeycomb structural body formed with plural honeycomb units.

First, a molded body of the honeycomb unit is manufactured by extruding the molded body from a mold (die), out of a raw material paste primarily including inorganic particles, inorganic fiber, and an inorganic binder. As described above, the inorganic particles include ceria particles and a ceramic material other than ceria particles having a lower degree of self-sintering than ceria particles. Other than these materials, in the raw material paste, an organic binder, a dispersion medium, and a molding aid may be added according to the moldability. As the organic binder, one or more organic binders may be selected from methylcellulose, carboxyl methylcellulose, hydroxyethylcellulose, polyethylene glycol, phenolic plastic, epoxy resin, or the like, although not particularly limited thereto. The blending quantity of the organic binder is preferably approximately 1 part by weight through approximately 10 parts by weight with respect to a total of 100 parts by weight of ceramic particles, inorganic fiber, and the inorganic binder. Examples of the dispersion medium are water, an organic solvent (e.g., benzene), alcohol (methanol) and the like, although not particularly limited thereto. Examples of the molding aid are ethylene glycol, dextrin, fatty acid, fatty acid soap, polyalcohol and the like, although not particularly limited thereto.

The raw material paste is preferably mixed and kneaded, for example, by using a mixer, an attritor and the like to mix it and by using a kneader or the like to sufficiently knead it, although not particularly limited thereto. For example, an extrusion molding method is a preferable method for molding the raw material paste into a shape having cells, although the method is not particularly limited thereto.

Next, the honeycomb molded body that has been formed is preferably dried. Examples of a drying apparatus used for the drying process are a microwave drying apparatus, a hot air drying apparatus, a dielectric drying apparatus, a suction drying apparatus, a vacuum drying apparatus, a freeze drying apparatus and the like, although not particularly limited thereto. The resultant honeycomb molded body is preferably degreased. The degreasing conditions are preferably approximately 400° C. for approximately two hours, although these conditions are not particularly limited thereto; the conditions are to be appropriately selected depending on the kind and amount of the organic substance included in the molded body. Furthermore, the resultant honeycomb molded body is preferably fired. The firing conditions are preferably approximately 600° C. through approximately 1,200° C., more preferably approximately 600° C. through approximately 1,000° C., although not particularly limited thereto. This is because if the firing temperature was approximately more than or equal to 600° C., the sintering of the inorganic particles would easily progress, and therefore the honeycomb unit would hardly have a low level of strength; if the firing temperature is less than or equal to approximately 1,200° C., the self-sintering of the ceria particles would hardly progress excessively, and therefore the adsorbing function of the $NO_X$ would hardly be degraded. By performing these procedures, it is possible to form a honeycomb unit having plural cells.

Next, a paste which later becomes the adhesive layers is applied onto the side surfaces of the honeycomb units, in such a manner as to have uniformity thicknesses. Sequentially, other honeycomb units are stacked onto each other with adhesive layers interposed therebetween. This procedure is repeated to manufacture a honeycomb structural body of a desired size (for example, with four horizontal rows and four vertical rows of honeycomb units).

As the paste for adhesive layers, it is possible to use a mixture of an inorganic binder and ceramic particles, a mixture of an inorganic binder and inorganic fiber, a mixture of an inorganic binder, ceramic particles and inorganic fiber or the like, although not particularly limited thereto. It is also possible to add an organic binder to this adhesive paste. As an example of the organic binder, one or more kinds of organic binder may be selected from polyvinyl alcohol, methylcellulose, ethyl cellulose, carboxyl methylcellulose, or the like, although not particularly limited thereto.

The thickness of the adhesive layer for joining the honeycomb units is preferably approximately 0.3 mm through approximately 2 mm. If the thickness of the adhesive layer was more than or equal to approximately 0.3 mm, sufficient bonding strength would be easily achieved. If the thickness was less than or equal to approximately 2 mm, the pressure loss would hardly be large.

Next, the honeycomb structural body is heated to dry and solidify the paste for adhesive layers, thereby forming the adhesive layers and fixing together the honeycomb units. Subsequently, this joined body is cut into a cylindrical shape.

Furthermore, it is possible to form a coat layer by applying a paste for the coat layer onto the peripheral surface of the honeycomb structural body, and then drying and solidifying the paste. The paste for the coat layer can be the same as or different from the paste for adhesive layers, although not particularly limited thereto. The compounding ratio of the paste for the coat layer can be the same as or different from that of the paste for adhesive layers. The thickness of the coat layer is not particularly limited.

After joining plural honeycomb units together with adhesive layers (in the case of providing a coat layer, after forming the coat layer), the honeycomb structural body is preferably heat-treated. When an organic binder is included in the paste for the adhesive layers and in the paste for the coat layer, the organic binder is preferably degreased and removed by the heat treatment. The conditions for the heat treatment are preferably approximately 700° C. for approximately two hours, although these conditions may be changed depending on the kind and amount of the included organic substance.

When a catalyst is supported on the cell walls of the honeycomb structural body, examples of the catalyst material are noble metals such as platinum, palladium, rhodium, or the like, although not particularly limited thereto. Furthermore, the cell walls may support a compound including an alkali metal, an alkali-earth metal, a rare-earth element, a transition metal, or the like. An example of a method of providing a platinum catalyst is to impregnate the honeycomb unit provided with catalyst supporting layers in dinitrodiammine platinum nitric acid solution ($[Pt(NH_3)_2(NO_2)_2]HNO_3$) or the like, and then heating the honeycomb unit.

EXAMPLES

Next, a description is given of examples according to the embodiment of the present invention.

Example 1

First, 2,707 parts by weight of ceria particles (average particle size 2 μm), 289 parts by weight of alumina particles (average particle size 0.5 μm) as the ceramic material having a lower degree of self-sintering than ceria particles, 345 parts by weight of alumina fiber (average fiber diameter 6 μm and average fiber length 100 μm), and 2,200 parts by weight of alumina sol were mixed together. To the resultant mixture, 320 parts by weight of methylcellulose as an organic binder, and small amounts of a plasticizer, a surface-active agent, and a lubricant were added. The mixture was mixed and kneaded to obtain a mixed compound. Next, a raw molded body was extruded from the mixed compound by an extrusion molding apparatus.

Next, a microwave drying apparatus and a hot air drying apparatus were used to thoroughly dry the raw molded body. Then, the raw molded body was degreased at 400° C. for two hours. Then, the raw molded body was fired at 700° C. for two hours, thereby achieving a porous honeycomb unit shaped as a square pillar (size: height 35 mm×width 35 mm×length 150 mm). The cell density of this porous honeycomb unit was 93 cells/cm$^2$, and the cell wall thickness was 0.2 mm.

Example 2

Next, by the same method as that of example 1, a honeycomb unit according to example 2 was manufactured. However, in example 2, the blending quantities of ceria and alumina were 2,418 parts by weight and 577 parts by weight, respectively. The other conditions were the same as those of example 1.

Example 3

Next, by the same method as that of example 1, a honeycomb unit according to example 3 was manufactured. However, in example 3, the blending quantities of ceria and alumina were 2,130 parts by weight and 866 parts by weight, respectively. The other conditions were the same as those of example 1.

Example 4

Next, by the same method as that of example 1, a honeycomb unit according to example 4 was manufactured. However, in example 4, boehmite was used as a ceramic material having a lower degree of self-sintering than ceria particles. The blending quantities of ceria and boehmite were 2,418 parts by weight and 577 parts by weight, respectively. The other conditions were the same as those of example 1.

Example 5

Next, by the same method as that of example 1, a honeycomb unit according to example 5 was manufactured. However, in example 5, silica (average particle size 0.5 μm) was used as a ceramic material having a lower degree of self-sintering than ceria particles. The blending quantities of ceria and silica were 2,418 parts by weight and 577 parts by weight, respectively. The other conditions were the same as those of example 1.

Example 6

Next, by the same method as that of example 1, a honeycomb unit according to example 6 was manufactured. However, in example 6, the alumina particles used as a ceramic material having a lower degree of self-sintering than ceria particles had an average particle size of 2 μm. The other conditions were the same as those of example 1.

Example 7

Next, by the same method as that of example 1, a honeycomb unit according to example 7 was manufactured. However, in example 7, ceria having an average particle size of 10 μm was used. The blending quantities of ceria and alumina were 2,418 parts by weight and 577 parts by weight, respectively. The other conditions were the same as those of example 1.

Example 8

Next, by the same method as that of example 1, a honeycomb unit according to example 8 was manufactured. However, in example 8, ceria having an average particle size of 0.1 μm was used. The blending quantities of ceria and alumina were 2,418 parts by weight and 577 parts by weight, respectively. The other conditions were the same as those of example 1.

Comparative Example 1

Next, by the same method as that of example 1, a honeycomb unit according to comparative example 1 was manufactured. However, in comparative example 1, only ceria having an average particle size of 2 μm was used as the inorganic particles. The other conditions were the same as those of example 1.

In Table 2, the blending quantities of inorganic particles as well as the average particle sizes of the inorganic particles included in the honeycomb units according to the each of the examples and the comparative example are shown together.

TABLE 2

| | CERIA | | CERAMIC MATERIAL HAVING LOW DEGREE OF SELF-SINTERING | | | PERCENTAGE (%) OF CERAMIC MATERIAL HAVING LOW DEGREE OF SELF-SINTERING WITH RESPECT TO INORGANIC PARTICLES (CERIA + CERAMIC MATERIAL HAVING LOW DEGREE OF SELF-SINTERING) | BEND STRENGTH (MPa) |
| --- | --- | --- | --- | --- | --- | --- | --- |
| | COMPOSITION (PARTS BY WEIGHT) | AVERAGE PARTICLE SIZE (μm) | MATERIAL | COMPOSITION (PARTS BY WEIGHT) | AVERAGE PARTICLE SIZE (μm) | | |
| EXAMPLE 1 | 2707 | 2 | ALUMINA | 289 | 0.5 | 10.7 | 6.2 |
| EXAMPLE 2 | 2418 | 2 | ALUMINA | 577 | 0.5 | 23.9 | 6.7 |
| EXAMPLE 3 | 2130 | 2 | ALUMINA | 866 | 0.5 | 40.6 | 7.6 |
| EXAMPLE 4 | 2418 | 2 | BOEHMITE | 577 | — | 23.9 | 8.2 |
| EXAMPLE 5 | 2418 | 2 | SILICA | 577 | 0.5 | 23.9 | 5.3 |

TABLE 2-continued

| | CERIA | | CERAMIC MATERIAL HAVING LOW DEGREE OF SELF-SINTERING | | | PERCENTAGE (%) OF CERAMIC MATERIAL HAVING LOW DEGREE OF SELF-SINTERING WITH RESPECT TO INORGANIC PARTICLES (CERIA + CERAMIC MATERIAL HAVING LOW DEGREE OF SELF-SINTERING) | BEND STRENGTH (MPa) |
|---|---|---|---|---|---|---|---|
| | COMPOSITION (PARTS BY WEIGHT) | AVERAGE PARTICLE SIZE (μm) | MATERIAL | COMPOSITION (PARTS BY WEIGHT) | AVERAGE PARTICLE SIZE (μm) | | |
| EXAMPLE 6 | 2418 | 2 | ALUMINA | 577 | 2 | 23.9 | 5.1 |
| EXAMPLE 7 | 2418 | 10 | ALUMINA | 577 | 0.5 | 23.9 | 6.3 |
| EXAMPLE 8 | 2418 | 0.1 | ALUMINA | 577 | 0.5 | 23.9 | 6.7 |
| COMPARATIVE EXAMPLE 1 | 2995 | 2 | — | — | — | — | 3.3 |

(Evaluation of Strength of Honeycomb Units)

Strength evaluation tests were performed on the honeycomb units according to examples 1 through 8 and comparative example 1 manufactured by the above methods. The strength evaluation test was conducted by performing three-point bend measurement. The measurement was performed in accordance with JIS-R1601, with the use of a three-point bend test apparatus 5582 manufactured by Instron. The contents of JIS-R1601 are incorporated herein by reference in their entirety.

The measurement was performed as follows. First, the crosshead speed was set at 1 mm/minute, and the inter-span length L was set at 135 mm. The breaking weight W was measured for each honeycomb unit, by applying weight in the vertical direction with respect to the longitudinal direction of each honeycomb unit. Next, the moment of the part of the cells of the honeycomb unit was subtracted to obtain a cross-sectional two dimensional moment Z. Then, the three-point bend strength σ was calculated with the following formula.

$$\sigma = WL/4Z \quad \text{formula (1)}$$

The measurement results for each of the honeycomb units are shown together in Table 2. It was confirmed with these results that the bend strengths of the honeycomb units according to examples 1 through 8 were significantly higher than that of the honeycomb unit according to comparative example 1.

The present invention is not limited to the specifically disclosed embodiment, and variations and modifications may be made without departing from the scope of the present invention.

What is claimed is:

1. A honeycomb structural body comprising:
at least one honeycomb unit having a longitudinal direction and comprising:
plural cell walls extending along the longitudinal direction from one end face to another end face of the at least one honeycomb unit to define plural cells;
an inorganic binder; and
inorganic particles comprising:
ceria particles; and
a ceramic material having a degree of self-sintering lower than a degree of self-sintering of the ceria particles,
wherein an average particle size of the ceramic material is less than or equal to an average particle size of the ceria particles, and
wherein the average particle size of the ceria particles is greater than 0.1 μm and less than 10 μm.

2. The honeycomb structural body according to claim 1, wherein the ceramic material comprises at least one of alumina, silica, and zeolite.

3. The honeycomb structural body according to claim 1, wherein a weight ratio of the ceramic material to the ceria particles is in a range of approximately 10% through approximately 40%.

4. The honeycomb structural body according to claim 1, wherein the inorganic binder comprises at least one of alumina sol, silica sol, titania sol, liquid glass, sepiolite, and attapulgite.

5. The honeycomb structural body according to claim 1, wherein the at least one honeycomb unit further comprises inorganic fiber.

6. The honeycomb structural body according to claim 5, wherein the inorganic fiber comprises at least one of alumina, silica, silicon carbide, silica alumina, glass, potassium titanate, and aluminum borate.

7. The honeycomb structural body according to claim 1, wherein an amount of the inorganic particles included in the at least one honeycomb unit is approximately 30 wt % through approximately 90 wt %.

8. The honeycomb structural body according to claim 1, wherein an amount of the inorganic binder included in the at least one honeycomb unit is approximately 5 wt % through approximately 50 wt % as solids content.

9. The honeycomb structural body according to claim 5, wherein a total amount of the inorganic fiber included in the at least one honeycomb unit is approximately 3 wt % through approximately 50 wt %.

10. The honeycomb structural body according to claim 1, wherein a cell density of the at least one honeycomb unit is approximately 15.5 cells/cm$^2$ through approximately 186 cells/cm$^2$.

11. The honeycomb structural body according to claim 1, wherein a thickness of each of the cell walls is approximately 0.1 mm through approximately 0.4 mm.

12. The honeycomb structural body according to claim 1, wherein the at least one honeycomb unit has plural pillar-shaped honeycomb units, and wherein the honeycomb structural body comprises adhesive layers joining the plural pillar-shaped honeycomb units.

13. The honeycomb structural body according to claim 1, wherein the honeycomb structural body is produced as a single body without adhesive layers.

14. The honeycomb structural body according to claim 1, wherein the cell walls include a catalyst.

15. The honeycomb structural body according to claim 14, wherein the catalyst includes at least one of noble metal, alkali metal, alkali-earth metal, a rare-earth element, and transition metal.

16. The honeycomb structural body according to claim 1, wherein the ceramic material is produced using at least one of a precursor of alumina, a precursor of silica, and a precursor of zeolite.

* * * * *